US012059793B2

(12) United States Patent
Luecke et al.

(10) Patent No.: US 12,059,793 B2
(45) Date of Patent: Aug. 13, 2024

(54) HAND-HELD, MOTOR-DRIVEN WORKING APPARATUS

(71) Applicant: Andreas Stihl AG & Co. KG, Waiblingen (DE)

(72) Inventors: Johannes Luecke, Waiblingen (DE); David Hampe, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 125 days.

(21) Appl. No.: 17/461,185

(22) Filed: Aug. 30, 2021

(65) Prior Publication Data

US 2022/0063083 A1 Mar. 3, 2022

(30) Foreign Application Priority Data

Aug. 31, 2020 (DE) ..................... 10 2020 210 983.4

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 6,872,121 B2 3/2005 Wiesner et al.
9,973,831 B2 * 5/2018 Mejegård ................ H04W 4/80
10,277,964 B2 * 4/2019 Stampfl .................... H04Q 9/00
10,489,988 B2 * 11/2019 Russ ...................... G01H 15/00
11,007,633 B2 * 5/2021 Brennenstuhl ............ B25F 5/02
2004/0182587 A1 * 9/2004 May .......................... B25F 5/00 173/176
2005/0280393 A1 * 12/2005 Feldmann ................. B25F 5/00 320/114
2008/0220324 A1 * 9/2008 Phillips ............ H01M 10/4207 29/623.1
2009/0251330 A1 10/2009 Gerold et al.
2014/0070924 A1 3/2014 Wenger et al.
2014/0151079 A1 * 6/2014 Furui ........................ B25F 5/00 173/171

(Continued)

FOREIGN PATENT DOCUMENTS

DE 102 38 710 A1 3/2004
DE 10 2008 000 973 A1 10/2009

(Continued)

OTHER PUBLICATIONS

German-language Search Report issued in German Application No. 10 2020 210 983.4 dated Apr. 6, 2021 (six (6) pages).

*Primary Examiner* — Lucas E. A. Palmer
(74) *Attorney, Agent, or Firm* — Crowell & Moring LLP

(57) ABSTRACT

A hand-held working apparatus has an apparatus housing, a working tool capable of being motor-driven, a drive motor for the working tool, and an operating data communication component connected to the apparatus housing and having a communication interface configured for wireless transmission of operating data. The operating data communication component has a mounting region by which it is mounted on an attachment region of the apparatus housing. The attachment region is located on an inside of an outer wall of the apparatus housing.

11 Claims, 3 Drawing Sheets

(56) References Cited

U.S. PATENT DOCUMENTS

| | | | | |
|---|---|---|---|---|
| 2014/0154535 | A1* | 6/2014 | Olsson | H01M 10/613 429/53 |
| 2014/0240125 | A1* | 8/2014 | Burch | B25H 3/02 340/539.13 |
| 2015/0340921 | A1 | 11/2015 | Suda et al. | |
| 2016/0005295 | A1* | 1/2016 | Ikeda | H04L 67/125 340/539.1 |
| 2016/0067859 | A1* | 3/2016 | Rejman | B25F 5/02 439/577 |
| 2016/0080038 | A1* | 3/2016 | Breitenbach | B25F 5/02 455/41.1 |
| 2016/0342151 | A1* | 11/2016 | Dey, IV | G06F 3/04842 |
| 2018/0345474 | A1* | 12/2018 | Brennenstuhl | B25F 5/02 |
| 2019/0043292 | A1* | 2/2019 | Hoossainy | G07C 9/30 |
| 2019/0217460 | A1* | 7/2019 | Mahalingappa | H02K 7/145 |
| 2020/0094393 | A1* | 3/2020 | Schadow | B25F 5/02 |
| 2020/0094394 | A1* | 3/2020 | Schadow | B25F 5/02 |
| 2021/0197357 | A1* | 7/2021 | Schadow | H05K 5/0247 |
| 2021/0252688 | A1* | 8/2021 | Nyberg | A01G 3/067 |
| 2021/0360775 | A1* | 11/2021 | Smith | H01Q 1/48 |

FOREIGN PATENT DOCUMENTS

| | | | |
|---|---|---|---|
| DE | 10 2015 006 596 | A1 | 11/2015 |
| DE | 10 2016 208 126 | A1 | 5/2017 |
| DE | 10 2016 118 805 | A1 | 4/2018 |
| DE | 10 2018 210 553 | A1 | 1/2020 |
| EP | 3 291 181 | A1 | 3/2018 |
| WO | WO 2013/134715 | A2 | 9/2013 |

* cited by examiner

HAND-HELD, MOTOR-DRIVEN WORKING APPARATUS

CROSS REFERENCE TO RELATED APPLICATION

This application claims priority under 35 U.S.C. § 119 from German Patent Application No. 102020210983.4, filed Aug. 31, 2020, the entire disclosure of which is herein expressly incorporated by reference.

BACKGROUND AND SUMMARY OF THE INVENTION

The invention relates to a hand-held working apparatus comprising an apparatus housing, a working tool capable of being motor driven, a drive motor for the working tool and an operating data communication component fitted to the apparatus housing and having a communication interface that is configured for wireless transmission of operating data, wherein the operating data communication component comprises a mounting region by which it is mounted on an attachment region of the apparatus housing.

The operating data communication component connected to the apparatus housing is in this case also referred to as an operating data component or simply a component for short. This component contains a communication interface that is configured for wireless transmission of operating data.

The working apparatus can be, for example, a floor-based or hand-held gardening or forestry working apparatus, such as a motor saw, a hedge trimmer, a leaf blower, a leaf extractor, a lawn mower, a pole-mounted pruner or a brush-cutter, or it can be another hand-held working apparatus, such as a cordless screwdriver, a drill, a food processor, etc.

The operating data can include, for example, data on the operating time of the working apparatus and more specifically data on its working tool or its drive motor and/or other tool-operation data, such as drive temperatures, drive power levels, accelerations, data derived from acoustic signals, load data, tool-user-related data, charging and/or voltage states of an energy storage device for the drive motor, usage locations, etc. The communication interface can work by using the so-called iBeacon format, for example, or be designed as a WLAN or Bluetooth interface.

For the operating data communication component, in the present case in particular, one such as disclosed in the laid-open publication EP 3 291 181 A1 can be used in conjunction with a working apparatus of the type mentioned above, to which reference can be made for further details of this design, wherein the operating data communication component is referred to there as a device for collecting operating data of a tool. In the working apparatus there, this operating data communication component is mounted on the outside of the apparatus housing, e.g. screwed onto an outer side of the apparatus housing or held there by means of a locking connection or inserted into a corresponding receptacle of a rating-plate section of the apparatus housing on the outside of the housing, wherein a mechanical decoupling between the operating data component and the apparatus housing can be provided by means of a soft component or a foam-like sealing compound, or the operating data component is glued onto the apparatus housing.

Laid-open publication US 2014/0070924 A1 discloses a system for identifying a type of a power tool with a usage attachment that can be mounted on the outside of a housing of the power tool for collecting, evaluating and transmitting operating data.

As an alternative to an outside mounting, in the case of hand-held working apparatuses it is also already known to receive such an operating data communication component in a receiving slot on the apparatus housing, as disclosed in patent publication U.S. Pat. No. 10,277,964 B2, for example.

Laid-open publication WO 2013/134715 A2 discloses a fleet management system for working equipment for outdoor use, such as gardening or forestry apparatuses, which includes, among other things, a user-carried identification unit, a data management server unit and a data sensor built into the interior of the respective working apparatus with a receiver, a memory, a processor, and one or more sensors for collecting and evaluating operating data. The data sensor there may be an ignition detection sensor arranged in or on an ignition unit of an internal combustion engine of the working apparatus, or a fuel supply detection sensor arranged in or on a fuel supply unit of an internal combustion engine, or a chip-integrated sensor which is arranged on a printed circuit board of a motor control unit of an electric drive motor of the working apparatus.

The technical problem of the invention is to provide a hand-held working apparatus of the type mentioned above, which offers advantages over the prior art described above, in particular due to the positioning of the operating data communication component.

The invention solves this problem by providing a hand-held working apparatus comprising an apparatus housing, a working tool capable of being motor driven, a drive motor for the working tool and an operating data communication component fitted to the apparatus housing and having a communication interface that is configured for wireless transmission of operating data, wherein the operating data communication component comprises a mounting region by which it is mounted on an attachment region of the apparatus housing, and wherein the attachment region of the apparatus housing on which the mounting region of the operating data communication component is mounted is located on an inner side of an outer wall of the apparatus housing. It turns out that this represents a particularly advantageous positioning of the operating data component.

On the one hand, this placement of the operating data component offers the advantage that the component is well protected by the adjoining outer wall of the apparatus housing against external dirt, possible damage due to the effects of shock, and detachment from the apparatus housing as well as any resulting loss. On the other hand, this implementation of the operating data component as a separate device component mounted on the inside of the apparatus housing, i.e. as a device component to be retrospectively attached separately from the rest of the working apparatus, avoids the need for radio device approval for the working apparatus, as may be necessary if the operating data component were permanently installed inside the housing, if the communication interface uses a corresponding radio channel.

In a development of the invention, the operating data communication component comprises an evaluation device coupled having at least one sensor for determining the operating data on the basis of measurement data captured by the sensor or sensors, which data is dependent on an operating state of the working tool. The design of the sensor or sensors depends on the measurement data or the relevant measurement variables required for determining the operating data, as is known per se from the prior art. Such sensors can be, for example, inductive sensors, temperature sensors, acoustic sensors and acceleration sensors. The operating data obtained from this evaluation can then be transmitted via the communication interface. Alternatively, the component can transfer the measurement data directly as operating data, e.g. to an external evaluation device.

In an embodiment of the invention, the operating data communication component comprises an operating data memory for storing the operating data determined by the evaluation device. The operating data can then be transmitted from the operating data memory via the communication interface. Alternatively, the operating data can be transmitted without being stored in the operating data component.

In an embodiment of the invention, the operating data communication component comprises at least one sensor, i.e. the sensor is an integral part of the component, preferably integrated into a common, integral component housing. In this case, the operational data communication component is formed as a combined operating data acquisition and operating data communication component, wherein it can be implemented as a single structure or consist of a plurality of individual, separate structures. Alternatively, the sensor forms a stand-alone component detached from the operating data communication component.

In a development of the invention, the apparatus housing has a battery compartment for removably inserting an accumulator unit that feeds the drive motor, and in that the operating data communication component is freely accessible from the battery compartment. This has the advantage that the operating data component is accessible via the battery compartment when the accumulator unit is removed from the battery compartment. This accessibility can be used, for example, to mount and/or remove the operating data component and/or to exchange an electrical battery of the component.

In an embodiment of the invention, the operating data communication component comprises a component housing, a battery receiving space in the component housing, and a removable housing cover that outwardly covers the battery receiving space and is located on a component housing side facing away from the mounting region, and the housing cover is freely accessible from the battery compartment. This means that a battery element which can be used in the component to provide its electrical supply is simple to replace without having to remove the apparatus housing and without having to remove the operating data component from its mounting on the inside of the external wall of the apparatus housing.

In an embodiment of the invention, the battery compartment comprises a compartment opening on a rear side or a top side of the apparatus housing and the attachment region is located on a side of the apparatus housing adjoining the side with the compartment opening. For many applications this represents a convenient location of the compartment opening, via which an associated accumulator unit, e.g. a suitable rechargeable battery pack, can be inserted into the battery compartment or removed again, and contributes to a ready accessibility of the operating data component via the battery compartment and its compartment opening when the accumulator unit is removed.

In a further embodiment of the invention, the attachment region is located axially at the height of the battery compartment on a longitudinal side or on an underside or on the top side of the apparatus housing. This represents advantageous placement options for the operating data component while at the same time providing good accessibility through the battery compartment.

In an embodiment of the invention, the working apparatus has an axial apparatus shaft with a rear end region where the apparatus housing is located and a frontal end region on which the working tool is located, and the attachment region is located axially between the rear end region of the apparatus shaft and the battery compartment. This represents an advantageous positioning option for the operating data component for the case in which the working apparatus is of a so-called shaft type, which means the working tool and the apparatus housing are connected to each other via the axial apparatus shaft, as in the case of a brushcutter, a pole-mounted pruner, etc.

Advantageous embodiments of the invention are shown in the drawings. These and other advantageous embodiments of the invention are described in more detail below.

DETAILED DESCRIPTION OF THE DRAWINGS

The hand-held working apparatus shown in the figures in several exemplary embodiments and various views includes an apparatus housing 1, a working tool 2 capable of being motor-driven, a drive motor 3 for the working tool 2, and an operating data communication component 4 mounted on the apparatus housing 1 and having a communication interface configured for wireless transmission of operating data.

Figure 1:
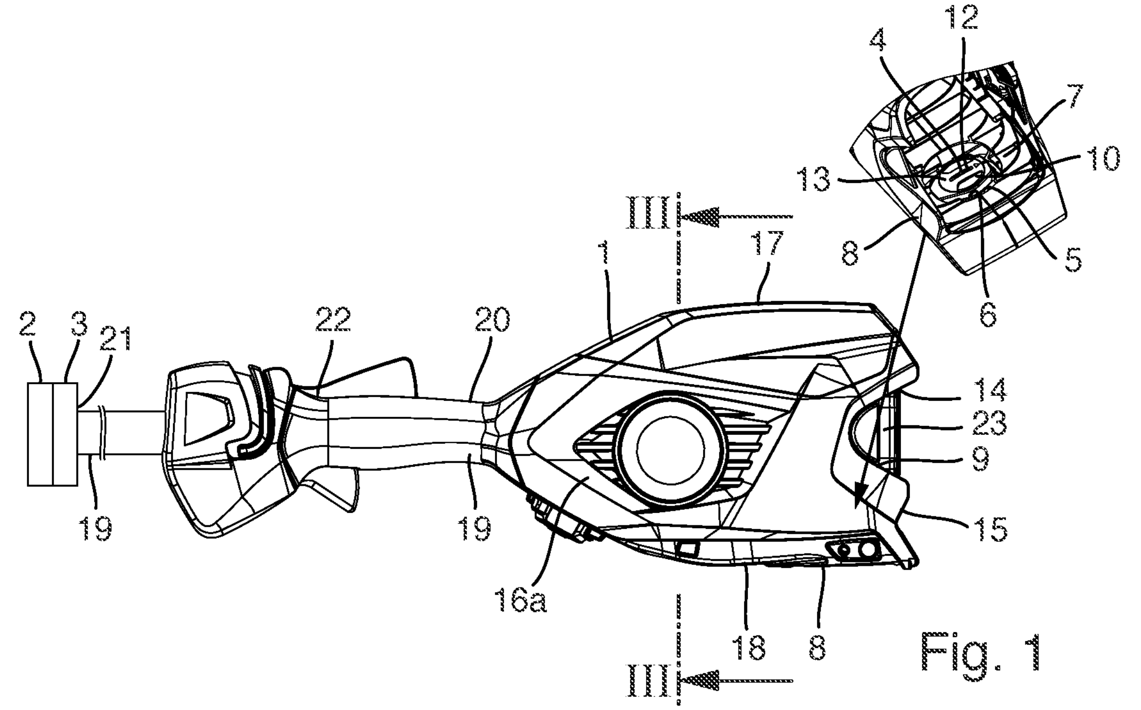
FIG. 1 shows a partially schematic side view and perspective sectional view of a hand-held electrical working apparatus with an operating data communication component placed on the inner, lower side.
Figure 2:
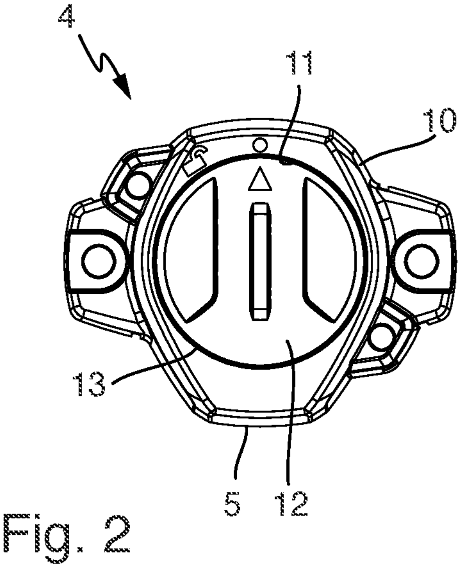
FIG. 2 shows a plan view of the operating data communication component.

The working tool 2 and the drive motor 3, which are of no further interest in this case, are shown merely schematically in FIG. 1 for the case of a shaft-type working apparatus. While FIG. 1 shows an embodiment of the shaft-type working apparatus in which the drive motor 3 as well as the working tool 2 are located on a frontal end region 21 of a apparatus shaft 19, in alternative embodiments the drive motor 3 is arranged elsewhere, e.g. inside the apparatus housing 1, this being a familiar motor positioning option to the person skilled in the art and therefore does not require any further explanation here. The apparatus shaft 19 runs essentially parallel to a longitudinal axis or axial direction of the apparatus housing.

The operating data communication component 4 comprises a mounting region 5 which is a flat main mounting side as in the embodiments shown, or alternatively it can be, e.g., a profiled region or a point-like region on the outside of the same and with which it is attached to an attachment region 6 of the apparatus housing 1. This attachment region 6 is located on an inner side 7 of an outer wall 8 of the apparatus housing 1. The mounting of the operating data communication component 4 with its mounting region 5 on the attachment region 6 of the apparatus housing 1 can be carried out in any way known to the person skilled in the art for this purpose, e.g. by means of an adhesive connection, a screw connection or a clamping/locking connection.

The placement of the operating data communication component 4 on the inside of the housing ensures a reliable protection of the component 4 from external influences by means of the outer wall 8 of the apparatus housing 1 externally adjacent to it. Since operating data communication component 4 can be attached to the apparatus housing 1 as a stand-alone component, there is no mandatory requirement for radio device approval for the working apparatus as a whole. The mounting of the operating data communication component 4 directly on the inside of the outer wall 8 of the apparatus housing 1 favors an optimum communication capability of the operating data communication component 4 with the external environment without interference effects due to other radio-shielding device components that are housed in the apparatus housing 1.

For example, the working apparatus can be a gardening or forestry apparatuses that is hand-held, such as one of the devices explicitly mentioned above. For manual handling, the working apparatus comprises one or more handles, which are appropriately configured and arranged according to the type of device, as is familiar to the person skilled in the art and which therefore does not require any further explanation here. In the examples shown, this includes an operating handle unit 22 with a grip region that can be grasped by the user with one hand, and with controls arranged on or near the grip region with which the user can control the drive motor among other things.

For example, the operating data communication component 4 can be one that is disclosed in the aforementioned laid-open publication EP 3 291 181 A1, which therefore does not require any further explanation here. In such an embodiment and in similar embodiments, the operating data communication component 4 comprises an evaluation device coupled having at least one sensor for determining the operating data on the basis of measurement data captured by the sensor that depends on an operating state of the working tool 2, and optionally also an operating data memory for storing the operating data determined by the evaluation unit. In corresponding implementations, the operating data communication component itself also contains the one or more sensors or some of the sensors. Inductive sensors, temperature sensors, acoustic sensors and acceleration sensors can be considered as suitable sensors.

In corresponding embodiments, the working apparatus is an electrical working apparatus, as in the examples shown, i.e. the drive motor 3 is an electric motor. As in the examples shown, an accumulator unit 23, i.e. a rechargeable battery or battery pack or the like, can be provided for supplying this electric motor. In these cases, the apparatus housing 1, as in the examples shown, preferably comprises a battery compartment 9 for removably inserting the accumulator unit 23 that supplies the drive motor 3.

The operating data communication component 4 is conveniently placed on the inside 7 of the outer wall 8 of the apparatus housing 1 in such a way that it is freely accessible from the battery compartment 9. As a result, the operating data communication component 4 can be moved from the battery compartment 9 to the desired mounting region 6 and attached there before the accumulator unit 23 is inserted into the battery compartment 9 or after it has been removed from it. If the battery compartment 9 is not occupied by the accumulator unit 23, the operating data communication component 4 is still accessible from battery compartment 9, e.g. to replace it with a new one in the event of a fault or to replace a battery contained in the operating data communication component 4.

In advantageous embodiments, the operating data communication component 4, as in the examples shown, comprises a component housing 10, a battery receiving space 11 in the component housing 10, and a removable housing cover 12 that outwardly covers the battery receiving space 11 and is located on a component housing side 13 facing away from the mounting region 5. The housing cover 12 is freely accessible from the battery compartment 9. If necessary, this enables a simple replacement of a battery received in the battery receiving space 11, which acts as an electrical energy source for power-consuming components of the operating data communication component 4. For such a battery replacement, the user only needs to remove the housing cover 12 from the component housing 11 away from the battery compartment 9, remove the battery to be replaced, insert a new battery, and mount the housing cover 12 back on the component housing 10. In alternative embodiments, the operating data communication component 4 does not require its own battery, e.g. in cases where it is externally supplied with power wirelessly.

In advantageous embodiments, the battery compartment 9 comprises a compartment opening 14, as in the examples shown, which is located on a rear side 15 of the apparatus housing 1, as in the examples shown, or alternatively on a top side 17 of the apparatus housing 1. The rear side 15 in this case forms the side of the apparatus housing 1 facing away from the working tool 2, i.e. the rear side thereof in the longitudinal direction. In this case, the attachment region 6 for mounting the operating data communication component 4 on the inside 7 of the outer wall 8 of the apparatus housing 1 is preferably located on a side of the apparatus housing 1 which is adjacent to the side on which the shaft opening 14 is provided. In the figures and examples shown, various possible positions of the attachment region 6 which satisfy this condition are illustrated.

FIG. 1 specifically illustrates a position of the attachment region 6, and thus of the operating data communication component 4 mounted there, on an underside 18 of the apparatus housing 1, i.e. on a housing side normally essentially facing downwards in the normal use of the working apparatus, axially at the height of the battery compartment 9, i.e. in a direction parallel to the housing longitudinal axis at a height between an axially frontal end and an axially rear end of the battery compartment 9 that forms the opening 14. The positioning of the component 4 on the associated attachment region 6, preferably in a designated receiving recess of the housing underside 18, can be ascertained in particular from the perspective detail view of the relevant housing region added to the side view in FIG. 1. In the example shown, the operating data communication component 4 is relatively close to the shaft opening 14 and is therefore easily accessible via the shaft opening 14.

Figure 3:
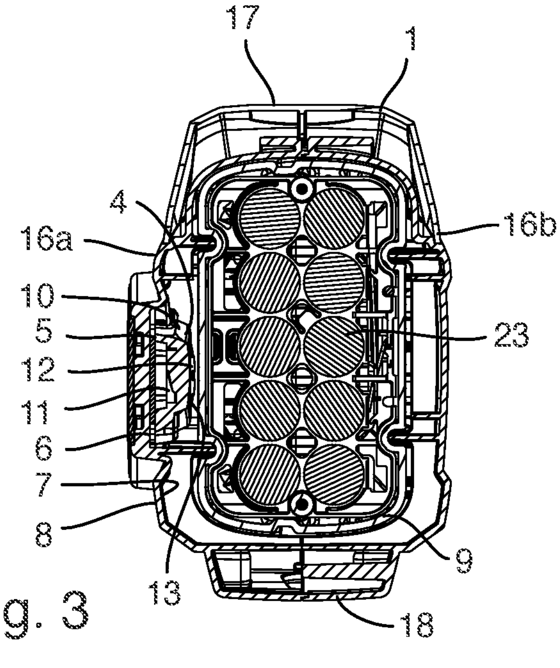
FIG. 3 shows a cross-sectional view along a line in FIG. 1 for a different placement of the operating data communication component.

FIG. 3 shows an alternative embodiment to FIG. 1 with the operating data communication component 4 positioned on the left-hand side instead of the top side. In this case, the attachment region 6 is located on a left-hand longitudinal side 16*a*, again axially at the height of the battery compartment 9.

Figure 4:
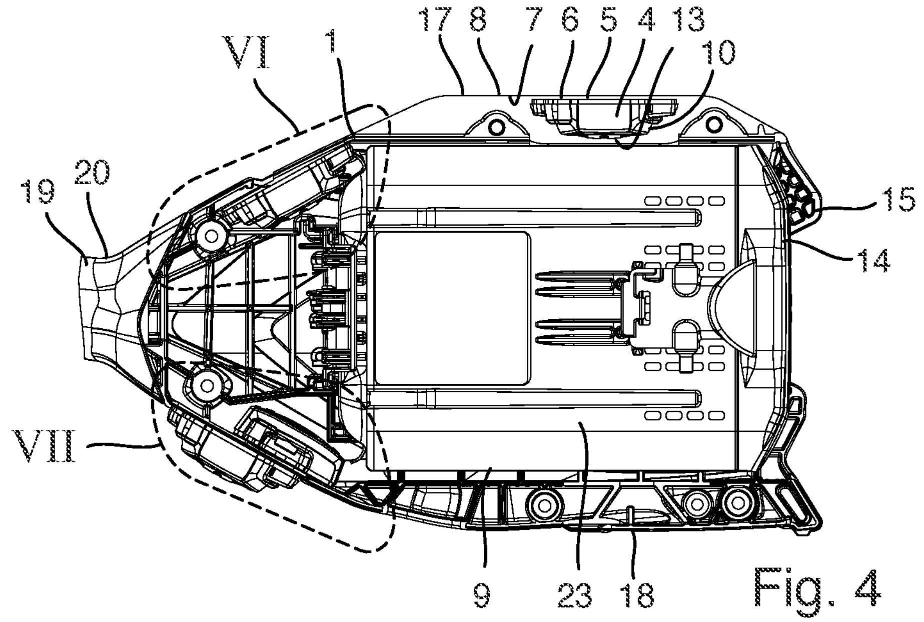
FIG. 4 shows a longitudinal sectional view of an apparatus housing of the working apparatus of FIG. 1 with various alternative placements of the operating data communication component.
Figure 5:
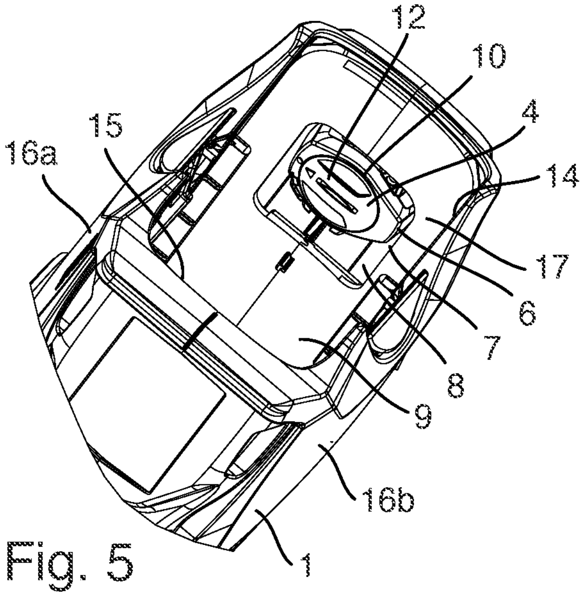
FIG. 5 shows a perspective view of a detail of the apparatus housing of FIG. 4 to illustrate a placement of the operating data communication component on the top side.
Figure 6:
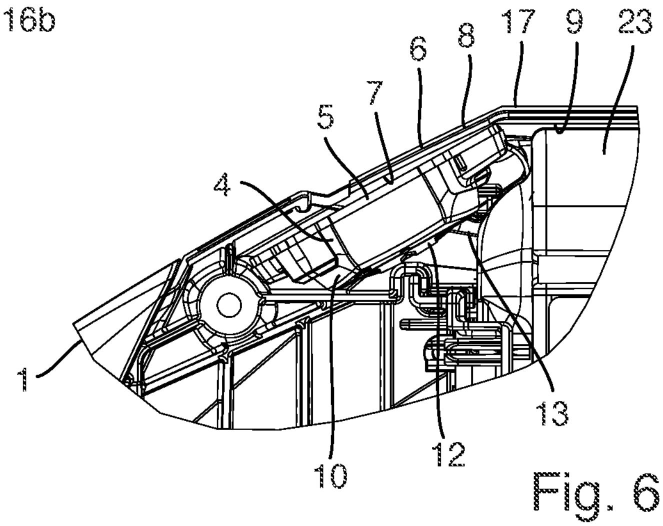
FIG. 6 shows a detailed view of a region VI in FIG. 4.
Figure 7:
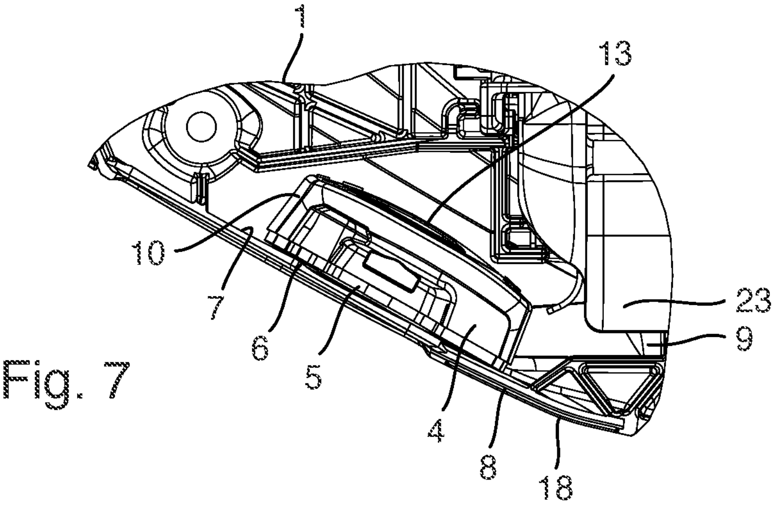
FIG. 7 shows a detailed view of a region VII in FIG. 4.

FIGS. 4 to 9 illustrate further possible positioning options for the attachment region 6 or the operating data communication component 4 which are fable depending on the requirements and application, where for the sake of simplicity several different alternative positioning options are shown jointly in FIG. 4, only one of which is preferably used in each actual working apparatus. In FIGS. 5 to 7, the positioning alternatives shown jointly in FIG. 4 are each shown separately as detail views.

FIG. 5 in conjunction with FIG. 4 illustrates a top-side positioning of the operating data communication component 4 on the inside 7 of the outer wall 6 of the apparatus housing 1, i.e. in this case the relevant attachment region 6 is located on the top side 17 of the apparatus housing 1 facing away from the underside 18. The attachment region 6 and thus the operating data communication component 4 are again axially located at the height of the battery compartment 9 and preferably again with a relatively small axial distance from the rear-side shaft opening 14.

FIG. 6 in conjunction with FIG. 4 illustrates a top-side position of the attachment region 6 and thus positioning of the operating data communication component 4 axially in front of the battery compartment 9, or the accumulator unit 23 inserted therein. If the working apparatus is of the shaft type, as shown in the examples, the apparatus housing 1 adjoins a rear end region 20 of the axial apparatus shaft 19. In the position chosen in accordance with FIG. 6 in conjunction with FIG. 4, the attachment region 6 is located axially between the rear end region 20 of the apparatus shaft 19 and the battery compartment 9 on the top side of the housing 17.

FIG. 7 in conjunction with FIG. 4 illustrates a position of the attachment region 6 and thus positioning of the operating data communication component 4 on the underside 18 of the apparatus housing 1 axially between the rear end region 20 of the apparatus shaft 19 and the battery compartment 9.

Even with the positioning options axially between the rear end region 20 of the apparatus shaft 19 and the battery compartment 9 according to FIGS. 6 and 7, the operating data communication component 4 remains accessible from the battery compartment 9 via its rear compartment opening 14 if the accumulator unit 23 is not located in the battery compartment 9.

Figure 8:
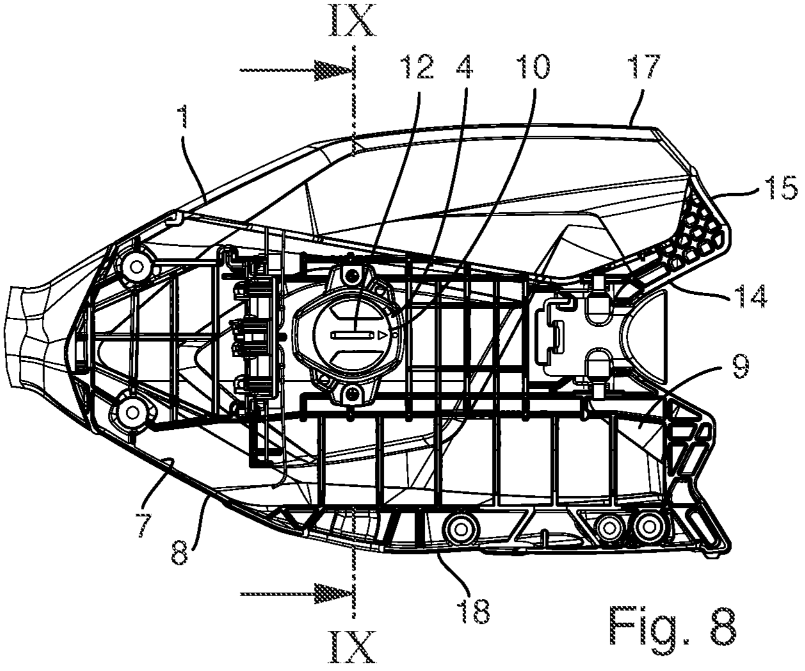
FIG. 8 shows the sectional view of FIG. 4 with the accumulator unit removed for a variant with placement of the operating data communication component on a longitudinal side.
Figure 9:
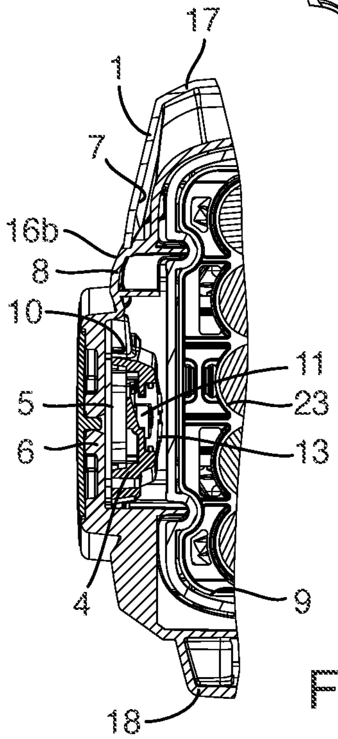
FIG. 9 shows a cross-sectional view of a detail along a line IX-IX in FIG. 8.

FIGS. 8 and 9 illustrate a right-sided position of the attachment region 6 or positioning of the operating data communication component 4, again axially at the height of the battery compartment 9, analogous to the left-sided positioning according to FIG. 3. In other words, the attachment region 6 in the example of FIGS. 8 and 9 is located on a right-hand longitudinal side 16*b* of the apparatus housing 1.

As the examples shown and the other exemplary embodiments explained above make clear, the invention provides an advantageous hand-held working apparatus, which in particular can be a gardening or forestry apparatuses, or alternatively another hand-held working apparatus, e.g. from the DIY sector, and which is equipped with an operating data communication component that enables wireless transmission of operating data of the device and is arranged in a protected manner inside the apparatus housing on the inside of an outer wall of the apparatus housing. This enables optimum protection of the operating data communication component against external influences, such as e.g. mechanical shocks and/or contamination. At the same time, the positioning of the operating data communication component on or near the outer wall of the housing enables optimum communication capability of the latter.

What is claimed is:

1. A hand-held working apparatus, comprising:
an apparatus housing;
a working tool capable of being motor driven;
a drive motor for the working tool; and
an operating data communication component fitted to the apparatus housing and having a communication interface that is configured for wireless transmission of operating data,
wherein
the operating data communication component comprises a mounting region by which the operating data communication component is mounted on an attachment region of the apparatus housing, a component housing separate from the apparatus housing, a battery receiving space in the component housing, and a removable housing cover which outwardly covers the battery receiving space and is located on the component housing on a side of the component housing that faces away from the mounting region, wherein the removable housing cover is accessible from a battery compartment of the apparatus housing, and
the attachment region is located on an inner side of an outer wall of the apparatus housing.

2. The hand-held working apparatus according to claim 1, wherein
the operating data communication component comprises a coupled evaluation device having at least one sensor for determining the operating data on the basis of measurement data captured by the sensor, said data being dependent on an operating state of the working tool.

3. The hand-held working apparatus according to claim 2, wherein
the operating data communication component comprises an operating data memory for storing the operating data determined by the evaluation device.

4. The hand-held working apparatus according to claim 2, wherein
the operating data communication component contains the sensor.

5. The hand-held working apparatus according to claim 1, wherein
the operating data communication component is freely accessible from the battery compartment, which battery compartment allows for removable insertion of an accumulator that feeds the drive motor.

6. The hand-held working apparatus according to claim 5, wherein
the housing cover is freely accessible from the battery compartment.

7. The hand-held working apparatus according to claim 5, wherein
the battery compartment comprises a compartment opening on a rear side of the apparatus housing or on a top side of the apparatus housing, and
the attachment region is located on a side of the apparatus housing adjacent to the side having the compartment opening.

8. The hand-held working apparatus according to claim 7, wherein
the attachment region is located axially at the height of the battery compartment on a longitudinal side or on an underside or on the top side of the apparatus housing.

9. The hand-held working apparatus according to claim 5, further comprising:

an axial apparatus shaft with a rear end region on which the apparatus housing is located, and a frontal end region on which the working tool is located, wherein the attachment region is axially located between the rear end region of the apparatus shaft and the battery compartment.

10. The hand-held working apparatus according to claim 1, wherein the apparatus is a gardening and/or forestry working apparatus.

11. The hand-held working apparatus according to claim 1, wherein the operating data communication component is a stand-alone component.

* * * * *